March 15, 1938.  G. W. PONTIUS, JR  2,111,297
BRAKE
Filed Dec. 31, 1936

INVENTOR
GEORGE W. PONTIUS, JR.
BY
M. W. McConkey
ATTORNEY

Patented Mar. 15, 1938

2,111,297

UNITED STATES PATENT OFFICE 2,111,297

BRAKE

George W. Pontius, Jr., South Bend, Ind., assignor to Bendix Products Corporation, South Bend, Ind., a corporation of Indiana Application December 31, 1936, Serial No. 118,449

2 Claims. (Cl. 188—78)

This invention relates to brakes, and is illustrated as embodied in an internal expanding brake for an automobile wheel.

An object of the invention is to provide a simple steady rest for positioning the brake shoe laterally. In the preferred forms this steady rest includes a stem passing through the backing plate of the brake and through the web of the brake shoe, in combination with a sleeve on the stem between the backing plate and the shoe web. The stem has heads or abutments at its ends, one of which engages the backing plate, while a spring is confined between the other one and the side of the shoe web.

Preferably the head of the above-described stem has ball-and-socket engagement with the outside of the backing plate, and the sleeve has ball-and-socket engagement with the inside of the backing plate.

Figure 1:
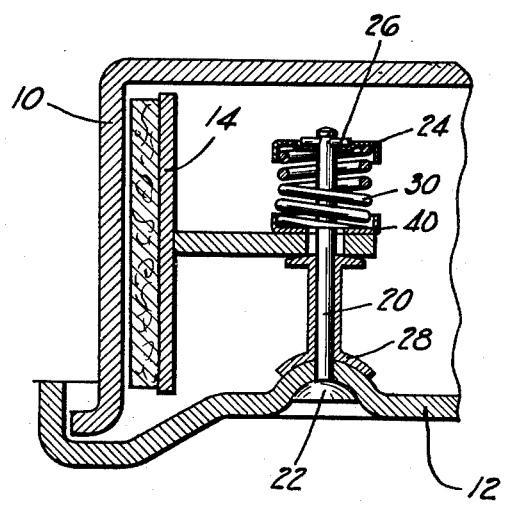
Figure 2:
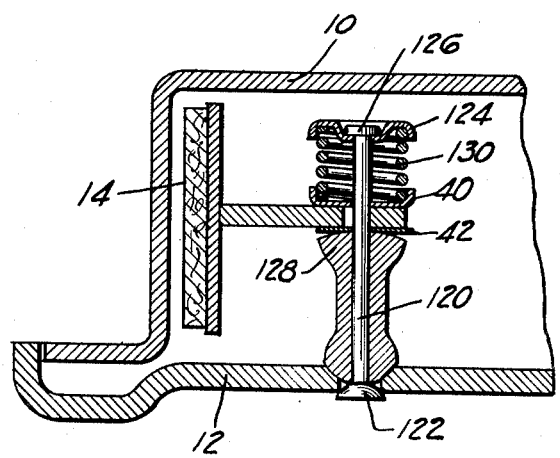

The above and other objects and features of the invention will be apparent from the following description of the illustrative embodiments shown in the accompanying drawing, in which:

Figures 1 and 2 are both partial radial sections through the brake, showing different embodiments.

The brake illustrated includes a rotatable drum 10, at the open side of which is a backing plate 12, and within which are the brake shoes, one of which is shown at 14. The illustrated shoe is T-shaped in cross-section, having an arcuate rim faced with brake lining and a stiffening web therefor.

The steady rest of Figure 1 includes a stem 20 passing through the backing plate and through the shoe web. This stem has at one end an abutment such as an integral head 22, rounded to have ball-and-socket engagement with a correspondingly-shaped socket in the outer face of the backing plate 12. The other end of the stem 20 has an abutment shown as a stamped washer 24 held by a cotter pin or the like 26.

A spool-shaped sleeve 28 is mounted on the stem 20 between the shoe web and the backing plate, its lower flange being concaved to have a ball-and-socket engagement with a rounded surface on the inner face of the backing plate, and its upper flange being rounded for rolling engagement with the shoe web.

A spring 30 is confined between the shoe web and the abutment 24.

In the disclosure of Figure 2, parts corresponding to those of Figure 1 are indicated by the same reference characters increased by 100.

In this embodiment, the outer end of sleeve 128 is rounded to have ball-and-socket engagement with a concave surface formed in the inner face of the backing plate, while its inner end is rounded for rolling engagement with the side of the shoe web. The cotter pin 26 is replaced by riveting over an integral head 126.

In both embodiments, engagement with the sides of the shoe web may be through stamped washers 40, 42.

While two illustrative embodiments have been described in detail, it is not my intention to limit the invention to those particular embodiments, or otherwise than by the terms of the appended claims.

I claim:

1. A brake comprising, in combination with a backing plate and a shoe having a web, a steady rest including a member having a stem passing through the backing plate and through said web and which has abutments at its ends one of which has ball-and-socket engagement with the outside of the backing plate, a sleeve on said stem between the web and backing plate and which has ball-and-socket engagement with the inside of the backing plate, and a spring confined between the shoe web and the other of said abutments.

2. A brake comprising, in combination with a backing plate and a shoe having a web, a steady rest including a member having a stem passing through the backing plate and through said web and which has abutments at its ends one of which engages the outside of the backing plate, a sleeve on said stem between the web and backing plate and which engages the inside of the backing plate, and a spring confined between the shoe web and the other of said abutments.

GEORGE W. PONTIUS, Jr.